US006217050B1

(12) United States Patent
Dickie et al.

(10) Patent No.: US 6,217,050 B1
(45) Date of Patent: Apr. 17, 2001

(54) ADJUSTABLE FOOTREST

(75) Inventors: Paul C. Dickie, Clovis, CA (US); Karen A. Hada, Boulder, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/191,178

(22) Filed: Nov. 13, 1998

(51) Int. Cl.[7] ...................................................... B62M 1/14
(52) U.S. Cl. ........................................ 280/291; 280/304.1
(58) Field of Search .................................... 280/291, 294, 280/304.1, 250.1; 248/229.14, 229.24, 284.1, 276.1

(56) References Cited

U.S. PATENT DOCUMENTS 229,670 * 7/1880 Carrick ................................. 384/273
1,261,442 * 4/1918 Rigby ..................................... 74/474
4,458,910 * 7/1984 Stillwagon ........................... 280/291
4,770,432 * 9/1988 Wagner ................................ 280/242
5,209,509 * 5/1993 Gay et al. ......................... 280/304.1
5,393,082 * 2/1995 Fenley ................................. 280/291
5,538,214 * 7/1996 Sinila ............................... 248/278.1
5,661,999 * 9/1997 Carone .................................. 74/474

OTHER PUBLICATIONS

Sunrise Medical Inc. MMG, Quickie Manual Products Parts Manual, Jan. 1996, p. 11.9.

* cited by examiner

*Primary Examiner*—Lanna Mai
*Assistant Examiner*—Andrew J. Fischer
(74) *Attorney, Agent, or Firm*—MacMillan, Sobanski & Todd, LLC

(57) ABSTRACT

An adjustable linkage assembly supports the footplate of a wheelchair footrest. The wheelchair footrest has a tube supported by the wheelchair frame. The linkage assembly comprises a plurality of pivots and a plurality of clamps. The clamps are structured and configured to releasably couple the pivots and the footplate together and in substantially fixed positions relative to one another. An extension tube is for use with a hanger mounted to a forward portion of a wheelchair. The extension tube adjustably supports a wheelchair footplate. The extension tube is engageable with a hollow portion of the hanger. The extension tube and the hanger are structured and dimensioned to be matingly engageable with one another and to prevent rotation of the extension tube relative to the hanger.

23 Claims, 6 Drawing Sheets

ADJUSTABLE FOOTREST

TECHNICAL FIELD

This invention relates in general to land vehicles and, in particular, to wheelchairs. Most particularly, the invention relates to wheelchair footrests for supporting the feet of a wheelchair occupant.

BACKGROUND OF THE INVENTION

Wheelchairs are provided with footrests. Footrests typically include a pair of footplates. Each footplate is generally horizontally disposed. Footplates are ordinarily substantially planar in construction. The footplates optionally support toe and ankle straps. The toe and ankle straps are provided for securing the wheelchair occupant's foot to an upper surface of the footplate. Footplates are generally fastened to the wheelchair side frames with saddle washers and threaded fasteners. Conventional footplates are typically capable of flipping up 90° from their generally horizontal position to a generally vertical position so as to permit ingress and egress of the wheelchair occupant to be accomplished with greater ease.

Although displacement of conventional footplates has historically been limited to the 90° displacement described above, more recent innovations in footrests have led to an ability to adjust the inclination or angle of footplates. This adjustment provision permits the ankle of the wheelchair occupant to be adjusted at various angles for the comfort of the wheelchair occupant.

Conventional footrests are limited in the ability of the footplates to be adjusted horizontally as well as vertically. Conventional footrests are also limited in that the footrests do not allow the footplates to be independently adjusted to accommodate wheelchair occupants having legs which are of different lengths. What is needed is an adjustable footrest that allows a footplate to be adjusted horizontally as well as vertically to accommodate various wheelchair occupant profiles. Moreover, it is desireable that footplates adjust independently for each leg of the wheelchair occupant.

SUMMARY OF THE INVENTION

This invention includes an adjustable linkage assembly for supporting the footplate of a wheelchair footrest. The wheelchair footrest has a tube supported by the wheelchair frame. The linkage assembly comprises a plurality of pivots and a plurality of clamps. The clamps are structured and configured to releasably couple the pivots and the footplate together and in substantially fixed positions relative to one another.

In another embodiment, the invention includes an extension tube for use with a hanger mounted to a forward portion of a wheelchair. The extension tube adjustably supports a wheelchair footplate. The extension tube is engageable with a hollow portion of the hanger. The extension tube and the hanger are structured and dimensioned to be matingly engageable with one another and to prevent rotation of the extension tube relative to the hanger.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
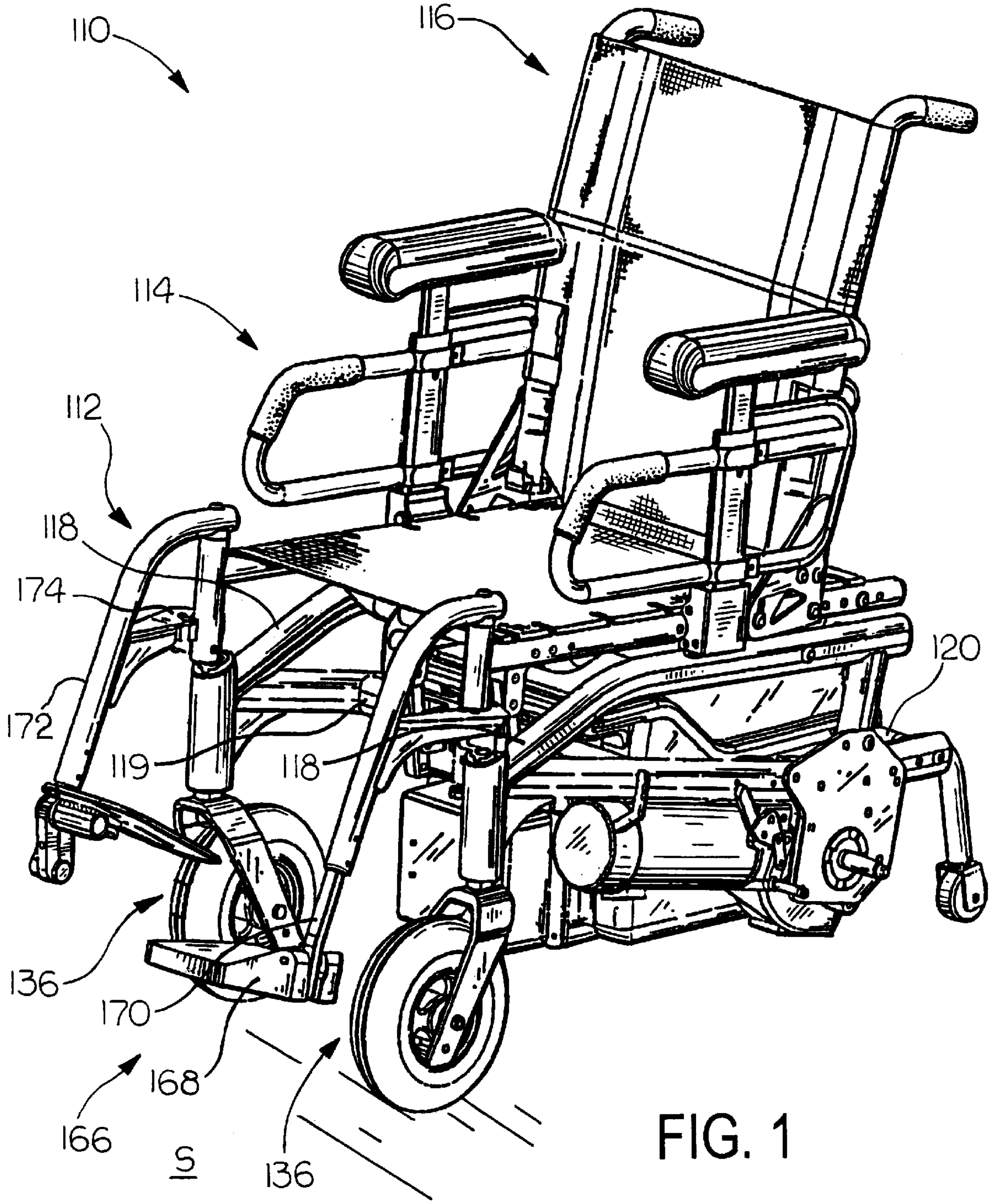
FIG. 1 is a front perspective view of a motorized wheelchair having a battery mounting system according to the invention.
Figure 2:
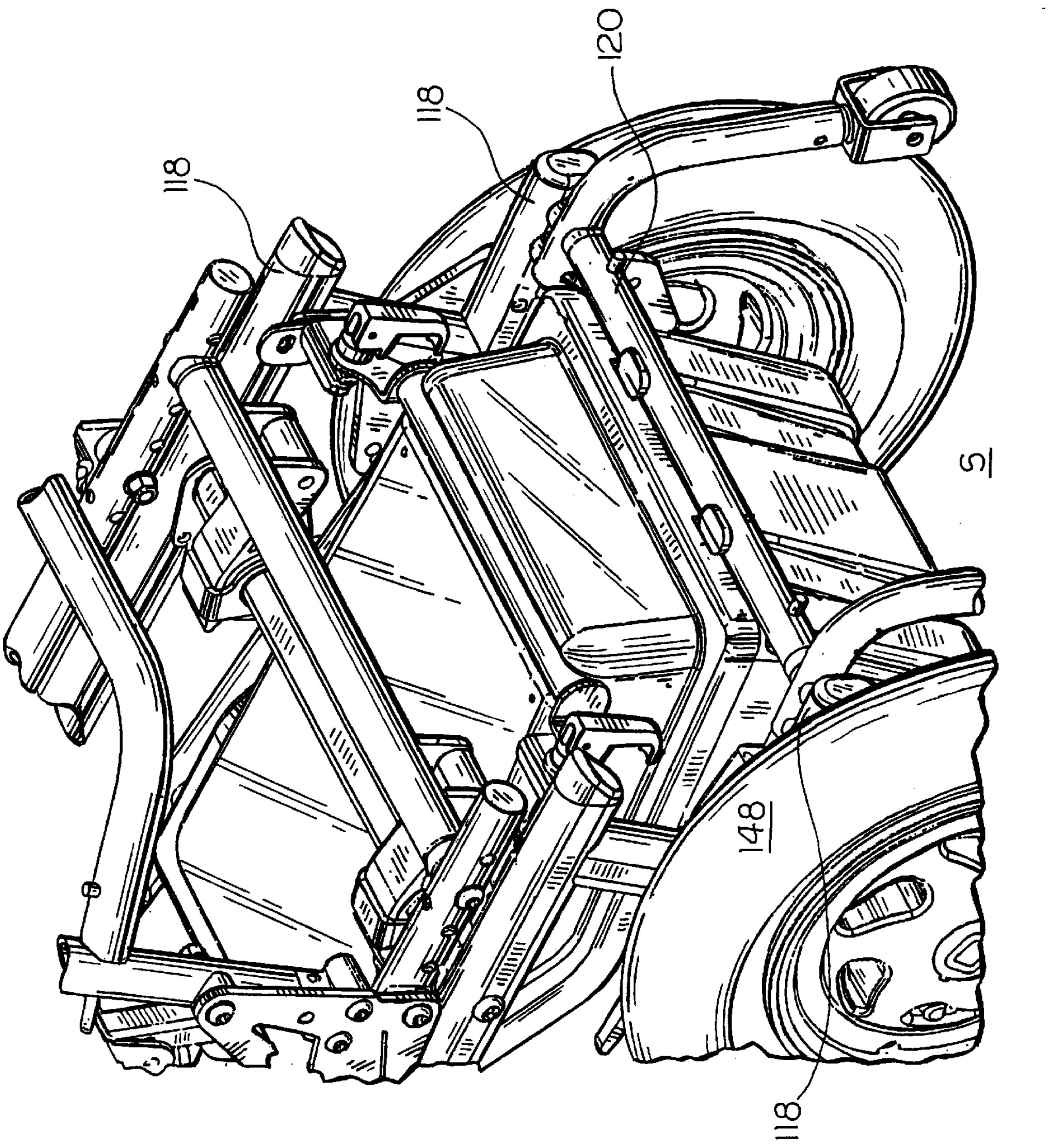
FIG. 2 is an enlarged rear perspective view of the wheelchair and battery mounting system shown in FIG. 1.

There is illustrated in FIGS. 1 and 2 a wheelchair 110 comprising a base 112 and a seat frame 114 and backrest 116 supported by the base 112. The base 112 comprises a pair of side frames 118 and lateral struts or cross tubes 119 and 120 spanning between, and connected to, the side frames 118. The side frames 118 and the cross tubes 119 and 120 are triangulated to produce a base 112 having suitable structural integrity to support a wheelchair occupant (not shown). A pair of front caster/fork assemblies 136 supports a front portion of the wheelchair 110 on a supporting surface S. As illustrated in FIG. 2, a pair of rear/drive wheels 148 supports a rear portion of the wheelchair 110 on the supporting surface S.

As shown in FIG. 1, a pair of footrests 166 each includes a footplate 168 for supporting the feet of the wheelchair occupant. The footrests 166 are supported on a front portion of the wheelchair 110. An extension tube 170 extends upwardly from the footplate 168. The extension tube 170 is slidably engageable with a hollow portion of a swing-away hanger 172. The swing-away hanger 172 is pivotally mounted to a forward portion of the wheelchair 110. A latch 174 is operatively connected to the swing-away hanger 172. The latch 174 cooperates with the swing-away hanger 172 to lock the swing-away hanger 172 in a forward position and to release the swing-away hanger 172 to permit the swing-away hanger 172 to be displaced to the sides, or out from in front, of the wheelchair 110.

Figure 3:
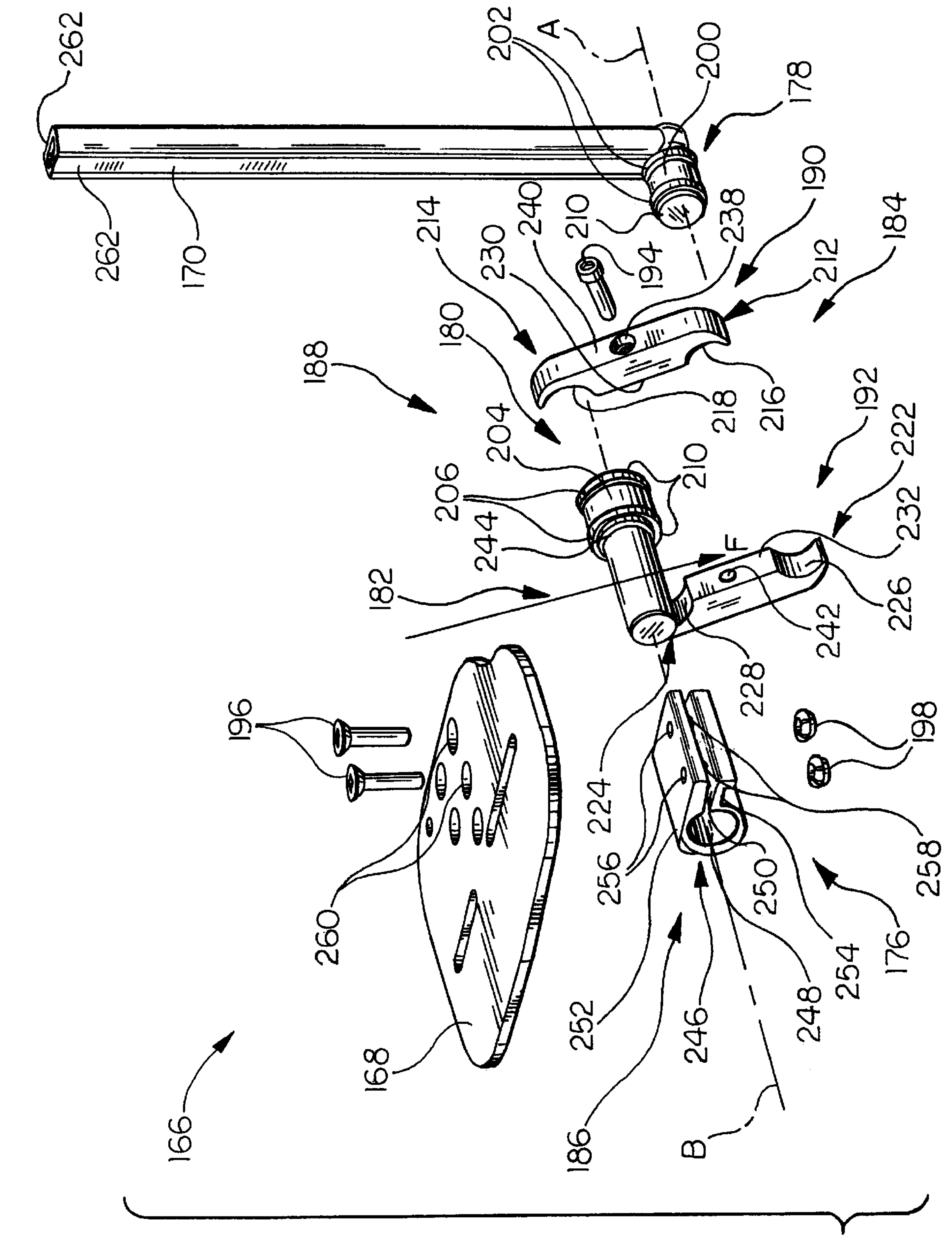
FIG. 3 is an enlarged rear-perspective view of the footrest shown in FIG. 1.

The present invention includes an adjustable linkage assembly 176, as shown in FIG. 3, for adjustably supporting the footplate 168 relative to the extension tube 170. The adjustable linkage assembly 176 comprises a plurality of fulcrum points or pivots 178, 180 and 182 and a plurality of clamps 184 and 186 for releasably coupling the pivots 178, 180 and 182 and the footplate 168 together and in substantially fixed positions relative to one another.

Three pivots 178, 180 and 182 are shown, including a first or extension pivot 178, a second or orbital pivot 180, and a third or footplate pivot 182. The extension pivot 178 extends laterally or substantially perpendicularly from the extension tube 170. The orbital pivot 180 is arranged in close proximity with the extension pivot 178. The axis "B" of the orbital pivot 180 is substantially parallel to the axis "A" of the extension pivot 178. The footplate pivot 182 extends substantially co-axially from the orbital pivot 180. The footplate pivot 182 and the orbital pivot 180 are arranged in tandem to define an adjustable footplate extension cylinder or a tandem pivot assembly 188.

There are illustrated in the drawings two clamps 184 and 186. These clamps include a first clamp, namely, the bifurcated tandem extension clamp 184, and a second clamp, namely, the footplate clamp 186. The tandem extension clamp 184 includes a recess clamp 190 and a threaded clamp

192. The recess clamp 190 and the threaded clamp 192 may be joined together about the extension pivot 178 and orbital pivot 180 with a socket cap screw 194. The tandem extension clamp 184 holds the orbital pivot 180 spaced apart relative to the extension pivot 178. The footplate clamp 186 is structured and dimensioned to clamp the footplate 168 to the footplate pivot 182. The footplate 168 is releasably attached to the footplate pivot 182 with fasteners, such as the flat head countersunk cap screws 196 and lock nuts 198 shown. Nylon insert lock nuts may be suitable for use in cooperation with the flat head countersunk cap screws 196 to reduce the risk of the flat head countersunk cap screws' 196 coming loose relative to the lock nuts 198.

The extension pivot 178 shown is generally spool-shaped in construction. That is to say, the extension pivot 178 includes a cylindrical annular depression or recess 200 formed between two raised surfaces or shoulders 202. Likewise, the orbital pivot 180 may be generally spool-shaped in construction wherein the orbital pivot 180 may be provided with an annular recess 204 formed between two shoulders 206. The shoulders 202 and 206 are preferably provided with chamfered or beveled surfaces 210 to reduce the risk of injury to the wheelchair occupant that may otherwise result if the surfaces 210 were substantially sharp. Moreover, chamfered or beveled surfaces 210 act as guides for directing the tandem clamp 184 into the annular recesses 200 and 204.

The recess clamp 190 and threaded clamp 192 of the tandem extension clamp 184 are elongated in construction. The recess clamp 190 has opposing ends, namely, a first end 212 and a second end 214. Each end 212 and 214 of the recess clamp 190 has a cylindrical relief 216 and 218. A substantially oblate or flat surface 230 spans between the two reliefs 216 and 218. Likewise, the threaded clamp 192 has a first end 222 and a second end 224, each of which has a cylindrical relief 226 and 228. A substantially oblate or flattened surface 232 spans between these two reliefs 226 and 228 as well.

The recess clamp 190 and the threaded clamp 192 may be coupled together to form the tandem extension clamp 184. The reliefs 216 and 226 at the first ends 212 and 222 of the recess clamp 190 and the threaded clamp 192, respectively, cooperatively form a first cylindrical bore or orifice 234 (shown in FIG. 4) which is cooperatively or matingly engageable with the extension pivot 178. Likewise, the reliefs 218 and 228 at the second ends 214 and 224 of the recess clamp 190 and the threaded clamp 192, respectively, cooperatively form a second cylindrical bore or orifice 236 (shown in FIG. 4) which is cooperatively or matingly engageable with the orbital pivot 180. The extension pivot 178 and the orbital pivot 180 are dimensioned and configured to fit tightly within the first and second cylindrical bores 234 and 236 upon applying the tandem extension clamp 184 to the pivots 178 and 180.

For example, the extension pivot 178 may have an outside diameter of about ½ inch and the first cylindrical bore 234 may have an inside diameter of about ½ inch, or even slightly less, so as to fit tightly around the extension pivot 178 upon clamping the tandem extension clamp 184 about the extension pivot 178. Similarly, the orbital pivot 180 may have an outside diameter of about ⅜ inch and the second cylindrical bore 236 may have an inside diameter of about ⅜ inch, or even slightly less, so as to fit tightly around the orbital pivot 180 upon clamping the tandem extension clamp 184 about the orbital pivot 180.

The recess clamp 190 and the threaded clamp 192 are joined together to form the tandem extension clamp 184 as follows. A hole 238 passes through the recess clamp 190. A portion of the hole 238 may be dimensioned to permit the socket cap screw 194 to be countersunk. That is to say, the hole 238 may be dimensioned to receive the head of the socket cap screw 194 so that the head of the socket cap screw 194 may be flush with the flat outer surface 240 of the recess clamp 190 when the extension clamp 184 is applied to the extension and orbital pivots 178 and 180.

The threaded clamp 192 has a threaded bore 242. The threaded bore 242 is threadably engageable with the socket cap screw 194. The extension clamp 184 is formed by placing the recess clamp 190 and the threaded clamp 192 about the extension and orbital pivots 178 and 180 with the extension and orbital pivots 178 and 180 being received by corresponding first and second cylindrical bores 234 and 236. The socket cap screw 194 is inserted into and through the hole 238 in the recess clamp 190 and threaded into the threaded bore 242. The socket cap screw 194 may be tightened until the extension and orbital pivots 178 and 180 are held tightly within the first and second cylindrical bores 234 and 236, respectively. The socket cap screw 194 is preferably tightened so as to hold the orbital pivot 180 in a fixed position relative to the extension pivot 178 for reasons which will become more apparent in the description that follows.

The footplate clamp 186 is a substantially elongated along the axis B as is the footplate pivot 182. The elongated construction of the footplate clamp 186 and the footplate pivot 182 enables the footplate clamp 186 and the footplate pivot 182 to cooperate to insure that the footplate 168 can support the weight of the wheelchair occupant's foot and leg (not shown) when encountering forces transverse to the footplate pivot 182 in the direction of the arrow "F".

As is clearly shown, the footplate pivot 182 is merely in the form of an elongated cylindrical shaft extending substantially co-axially from the orbital pivot 180. It should be noted that the footplate pivot 182 is depressed or recessed relative to the shoulder 206 of the orbital pivot 180 adjacent to the footplate pivot 182. The shoulder 206 adjacent to the footplate pivot 182 provides an abutment surface 244 for the footplate clamp 186 to abut.

The footplate clamp 186 comprises an elongated member 246. The elongated member 246 defines a cylindrical bore 248 having an axis along the arrow "B" (shown FIG. 3). The elongated member 246 is furcated so as to provide a longitudinal break or slit 250 in the elongated member 246 which communicates with the cylindrical bore 248. An upper substantially planar element 252 extends from the elongated member 246, substantially tangentially from the cylindrical bore 248. Extending from the elongated member 246 is a lower substantially planar element 254. The lower substantially planar element 254 extends substantially radially relative to the cylindrical bore 248. The upper substantially planar element 252 originates adjacent to an upper boundary of the longitudinal split 250 and the lower substantially planar element 254 originates adjacent to a lower boundary of the longitudinal split 250. Each substantially planar element 252 and 254 is generally elongated and rectangular in construction. The substantially planar elements 252 and 254 are arranged in a substantially co-planar relationship relative to one another. The elongated member 246 is compressible to the extent that the substantially planar elements 252 and 254 can be moved towards each other, along the lines G—G (shown in FIG. 4), resulting in a reduction in the diameter of the cylindrical bore 248. This permits the elongated member 246 to clamp tightly upon the footplate pivot 182.

The upper substantially planar element 252 is provided with a pair of spaced apart holes 256. Likewise, the lower substantially planar element 254 is provided with a pair of spaced apart holes 258. The holes 256 in the upper substantially planar element 252 are arranged to co-align with the holes 258 in the lower substantially planar element 254. These co-aligning holes 256 and 258 are arranged to co-align with holes 260 in the footplate 168. The holes 256, 258, and 260 co-align to permit the passage of the flat head countersunk cap screws 196 through the holes 256, 258, and 260. The holes 260 in the footplate 168 are dimensioned to permit the head of the flat head countersunk cap screw 196 to be substantially flush with the surface of the footplate 168 upon clamping the footplate 168 to the footplate pivot 182.

The footplate 168 is clamped to the footplate pivot 182 as follows. The footplate pivot 182 is inserted into the footplate clamp 186. The footplate 168 is oriented above the footplate clamp 186 with the holes 256, 258, and 260 in the footplate 168 and the footplate clamp 186 arranged so as to co-align with one another. The flat head countersunk cap screws 196 are passed through the co-aligning holes 256, 258, and 260 in the footplate 168 and the footplate clamp 186. Lock nuts 198 are arranged below the co-aligning holes 256, 258, and 260. The flat head countersunk cap screws 196 are threaded into corresponding lock nuts 198. The flat head countersunk cap screws 196 are tightened into the lock nuts 198 until the footplate clamp 186 clamps tightly about the footplate pivot 182. The cooperative engagement of the flat head countersunk cap screws 196 and the lock nuts 198 serves two purposes. In addition to clamping the footplate clamp 186 about the footplate pivot 182, the flat head countersunk cap screws 196 and the lock nuts 198 secure the footplate 168 to the footplate clamp 186.

Figure 4:
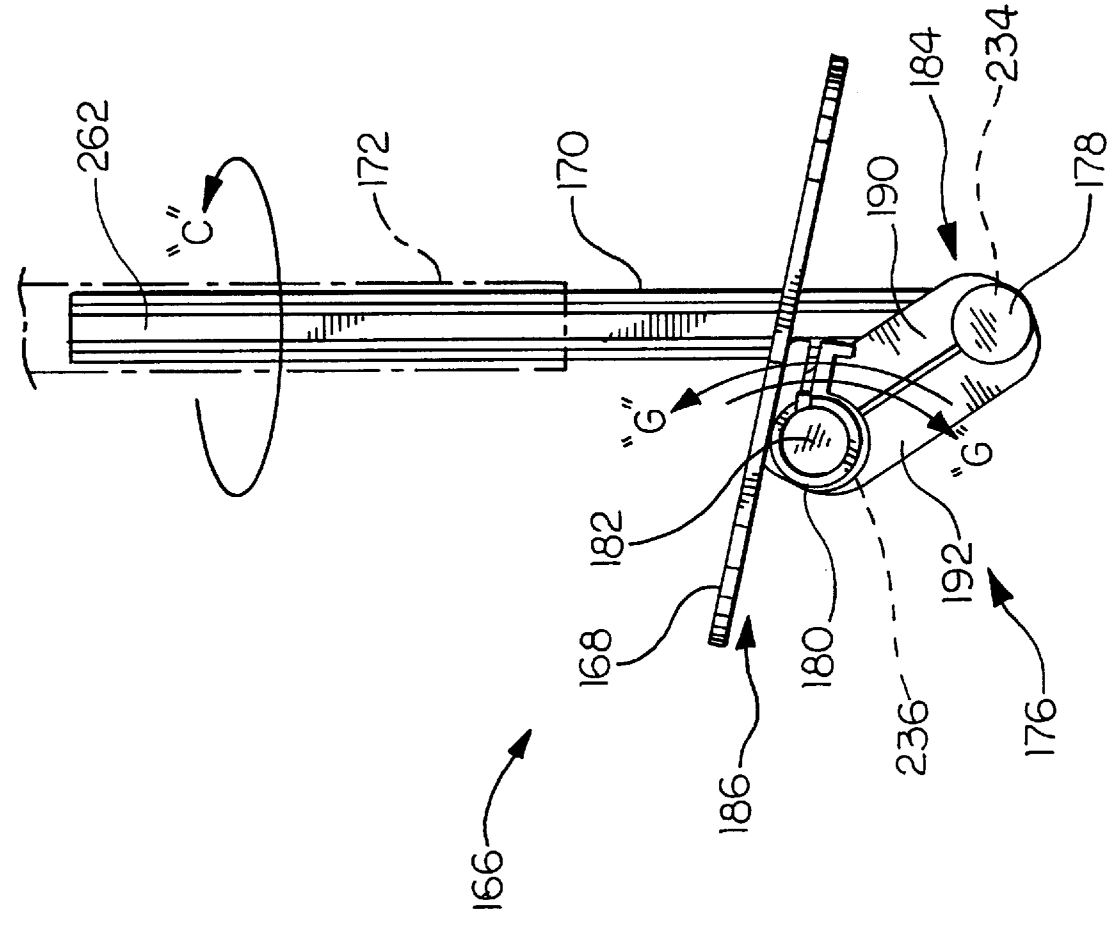
FIG. 4 is a side elevational view of the footrest in a first position.

The operation of the adjustable linkage assembly 176 is illustrated with reference to FIGS. 4 through 6. As shown in FIG. 4, the extension tube 170 slidably engages the swing-away hanger 172. The elevation of the extension tube 170 is adjustable relative to the swing-away hanger 172 to adjust the height of the footplate 168. The extension tube 170 is preferably extruded in a shape that is complementary to that of the swing-away hanger 172 so that the extension tube 170 and the swing-away hanger 172 are configured to matingly engage one another. The term “complemetary” here means keyed relative to one another, or having a shape the that closely fits or mates to one another. Although this mating engagement should permit the extension tube 170 to be vertically adjustable relative to the swing-away hanger 172, the engagement between the extension tube 170 and the swing-away hanger 172 should prevent rotation of the extension tube 170 relative to the swing-away hanger 172 in a direction of the arrow “C”, thereby retaining the footplates 168 in a forwardly disposed position. One manner of resisting rotation between the extension tube 170 and the swing-away hanger 172 is to provide the extension tube 170 with at least one flat side 262 that cooperatively engages a flat side (not shown) within the swing-away hanger 172, or that is engageable with a fastener, such as a set screw (not shown). Alternatively, the extension tube 170 and the swing-away hanger 172 may be provided with a matingly engageable spline and flute (not shown). These are merely examples of configurations that may be employed to prevent rotation between the extension tube 170 and the swing-away hanger 172. Although the extension tube 170 is extruded, the extension tube 170 may be formed or fabricated in other manners.

The recess clamp 190 and the threaded clamp 192 are joined together about the extension pivot 178 and the orbital pivot 180 to form the tandem extension clamp 184. The footplate pivot 182 is inserted into the footplate clamp 186 and secured relative to the footplate clamp 186 while fastening the footplate 168 to the footplate clamp 186. The socket cap screw 194 and flat head countersunk cap screws 196 are tightened so as to retain the pivots 178, 180, and 182 and the footplate 168 in fixed positions.

Figure 5:
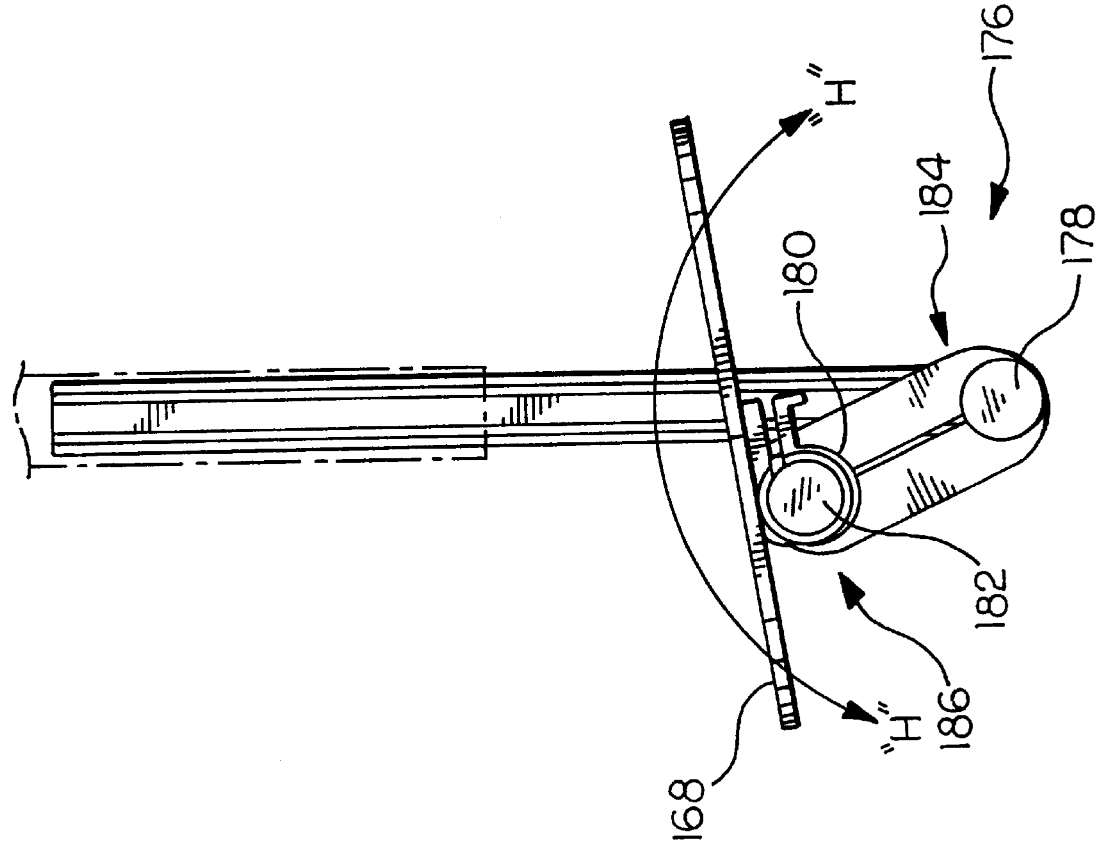
FIG. 5 is a side elevational view of the footrest in a second position.

By loosening the flat head countersunk cap screws 196 (shown in FIG. 3) relative to the lock nuts 198 (also shown in FIG. 3), the footplate clamp 186 may be freed to pivot about the footplate pivot 182 along the lines H—H, as shown in FIG. 5. This permits the inclination of the footplate 168 to be adjusted to suit the wheelchair occupant. Moreover, the angle of inclination of the footplate 168 along the lines H—H may be adjusted to accommodate changes in the position of the orbital pivot 180 relative to the extension pivot 178.

Figure 6:
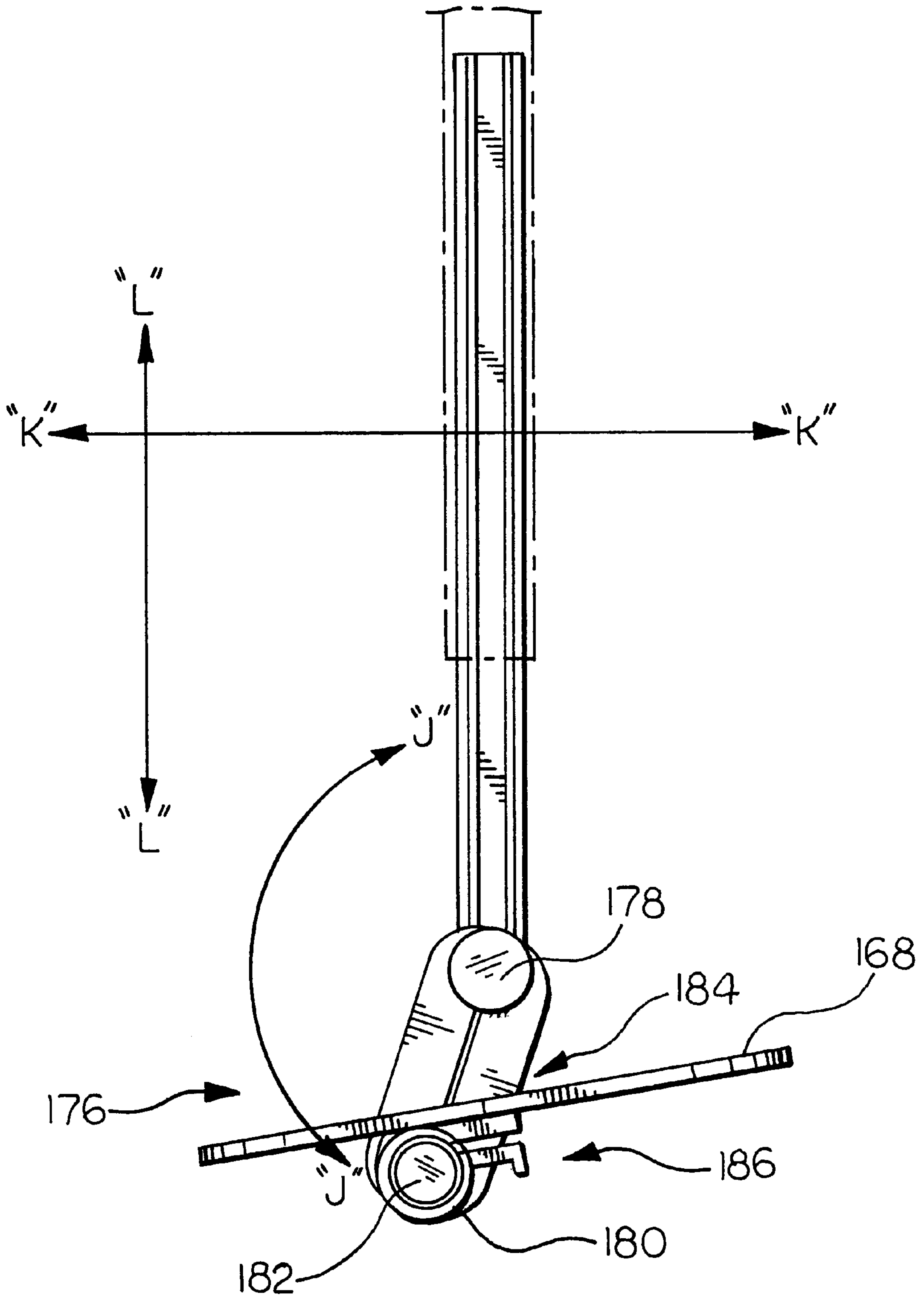
FIG. 6 is a side elevational view of the footrest in a third position.

As shown in FIG. 6, the position of the orbital pivot 180 may be changed relative to the extension pivot 178. This is accomplished by loosening the socket cap screw 194 (shown in FIG. 3) sufficiently to permit the extension pivot 178 and the orbital pivot 180 to move relative to the tandem extension clamp 184, or vice versa. With the socket cap screw 194 loosened, the orbital pivot 180 may be displaced about the extension pivot 178 along the lines J—J.

As shown in FIGS. 2 through 4, the adjustable linkage assembly 176 permits the footplate 168 to be adjusted forward and back as well as up and down. This permits the footplate 168 to be positioned to accommodate various wheelchair occupants. For example, wheelchairs may be outfitted with the adjustable linkage assembly 176 during production. When the wheelchair occupant is fitted for the wheelchair, the adjustable linkage assembly 176 may be adjusted to accommodate the profile of the specific wheelchair occupant. Alternatively, the adjustable linkage assembly 176 may be retrofitted to existing wheelchairs as an after-market product. The adjustable linkage assembly 176 is not limited in its application to permit the wheelchairs to be sized to specific wheelchair occupants, but is also suitable for permitting the position of the lower appendages of the wheelchair occupant to be changed.

The clamps 184 and 186 shown are merely illustrative of clamps that can be used to carry out the invention. Other clamping arrangements may be suitable for carrying out the invention so long as the clamps may be loosened to permit the pivot linkage assembly 176 to be adjusted or manipulated at the pivots 178, 180 and 182. It should be also understood that other pivots, or that a greater or a lesser number of pivots, may be included so long as the adjustable linkage assembly permits the footplate 168 to be adjusted or manipulated. For example, the adjustable linkage assembly should permit the extensibility and the elevation of the footplate to be adjusted in a forward and rearward direction along the lines K—K (shown in FIG. 6) or upward and downward along the lines L—L (shown in FIG. 6).

The pivot linkage assembly 176 is preferably fabricated or formed from a substantially rigid or non-elastic material. The pivot linkage assembly 176 should be strong and sturdy. It is preferable that the pivot linkage assembly 176 be made of a metallic material and, most preferably, made of aluminum.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An adjustable linkage assembly comprising:

a footrest tube;

a footplate;

a plurality of pivots including at least three pivots including a first pivot, a second pivot, and a third pivot, said first pivot extending from the footrest tube, said first pivot having an axis and said second pivot having an axis substantially parallel to the axis of said first pivot, said third pivot extending substantially co-axially from said second pivot; and a plurality of clamps for releasably coupling said pivots and the footplate together and in substantially fixed positions relative to one another.

2. An adjustable linkage assembly according to claim 1, wherein one of said pivots extends from an extension tube, said extension tube being adapted to engage a footrest hanger.

3. An adjustable linkage assembly according to claim 1, wherein said first pivot and said second pivot are each generally spool-shaped in construction.

4. An adjustable linkage assembly according to claim 1, wherein said first pivot and said second pivot each include spaced apart shoulders and a cylindrical annular recess formed between said shoulders.

5. An adjustable linkage assembly according to claim 1, wherein said plurality of clamps includes at least two clamps including a first clamp and a second clamp, said first clamp being structured and dimensioned to hold said second pivot spaced apart relative to said first pivot, said second clamp being structured and dimensioned to clamp the footplate to said third pivot.

6. An adjustable linkage assembly according to claim 5, wherein said first clamp is bifurcated to include a recess clamp and a threaded clamp, said recess clamp and said threaded clamp being structured and dimensioned to be joined together about said first pivot and said second pivot.

7. An adjustable linkage assembly according to claim 6, wherein said recess clamp and said threaded clamp are each elongated in construction, said recess clamp and said threaded clamp each further having opposing ends, a cylindrical relief at each one of said opposing ends, and a substantially flat surface spanning between said reliefs at said opposing ends, said recess clamp and said threaded clamp being structured and dimensioned to be coupled together to cooperatively form a first cylindrical bore which is matingly engageable with said first pivot and a second cylindrical bore which is matingly engageable with said second pivot.

8. An adjustable linkage assembly according to claim 7, wherein said first pivot and said second pivot are dimensioned and configured to fit tightly within said first cylindrical bore and said second cylindrical bore.

9. An adjustable linkage assembly according to claim 5, wherein said third pivot is substantially elongated and said second clamp is substantially elongated.

10. An adjustable linkage assembly according to claim 5, wherein said third pivot is an elongated cylindrical shaft extending substantially co-axially from said second pivot; and said second clamp comprises:

an elongated member defining a cylindrical bore, said elongated member having a longitudinal slit which communicates with said cylindrical bore;

an upper substantially planar element extending from said elongated member; and a lower substantially planar element extending from said elongated member, said substantially planar elements being arranged in a substantially co-planar relationship relative to one another, said elongated member being compressible to an extent that said substantially planar elements can be moved towards one another, resulting in a reduction in the diameter of said cylindrical bore.

11. An adjustable linkage assembly according to claim 10, further including:

a shoulder between said second pivot and said third pivot, said third pivot being recessed relative to said shoulder, said shoulder providing an abutment surface for said footplate clamp.

12. An adjustable linkage assembly for supporting the footplate of a wheelchair footrest having a tube supported by the wheelchair frame, said linkage assembly comprising:

at least three pivots including an extension pivot, an orbital pivot, and a footplate pivot, said extension pivot extending from the footrest tube, said extension pivot having an axis and said orbital pivot having an axis substantially parallel to the axis of said extension pivot, said footplate pivot extending substantially co-axially from said orbital pivot; and at least two clamps structured and dimensioned to releasably couple said pivots and the footplate together and in substantially fixed positions relative to one another, said clamps including an extension clamp and a footplate clamp, said extension clamp being structured and dimensioned to hold said orbital pivot spaced apart relative to said extension pivot, said footplate clamp being structured and dimensioned to clamp the footplate to said footplate pivot.

13. An adjustable linkage assembly according to claim 12, wherein said extension pivot and said orbital pivot are each generally spool-shaped in construction.

14. An adjustable linkage assembly according to claim 12, wherein said extension clamp is bifurcated to include a recess clamp and a threaded clamp, said recess clamp and said threaded clamp each being elongated in construction, said recess clamp and said threaded clamp each further having opposing ends, a cylindrical relief at each one of said opposing ends, and a substantially flat surface spanning between said reliefs at said opposing ends, said recess clamp and said threaded clamp being structured and dimensioned to be coupled together to cooperatively form a first cylindrical bore which is matingly engageable with said extension pivot and a second cylindrical bore which is matingly engageable with said orbiting pivot.

15. An adjustable linkage assembly according to claim 12, wherein said footplate pivot is an elongated cylindrical shaft extending substantially co-axially from said orbiting pivot; and said footplate clamp comprises:

an elongated member defining a cylindrical bore, said elongated member having a longitudinal slit which communicates with said cylindrical bore;

an upper substantially planar element extending from said elongated member; and a lower substantially planar element extending from said elongated member, said substantially planar elements being arranged in a substantially co-planar relationship relative to one another, said elongated member being compressible to an extent that said substantially planar elements can be moved towards one another, resulting in a reduction in the diameter of said cylindrical bore.

16. A wheelchair comprising:

a wheelchair frame;

a footrest comprising:

a tube supported by said wheelchair frame;

a footplate; and a linkage assembly linking said footplate to said tube, said linkage assembly comprising:

a plurality of pivots including at least three pivots including a first pivot, a second pivot, and a third pivot, said first pivot extending from the footrest tube, said first pivot having an axis and said second pivot having an axis substantially parallel to the axis of said first pivot, said third pivot extending substantially co-axially from said second pivot; and a plurality of clamps for releasably coupling said pivots and the footplate together in substantially fixed positions relative to one another.

17. A wheelchair according to claim 16, wherein said extension pivot and said orbital pivot are each generally spool-shaped in construction.

18. A wheelchair according to claim 16, wherein said plurality of clamps includes at least two clamps including an extension clamp and a footplate clamp, said extension clamp being structured and dimensioned to hold said orbital pivot spaced apart relative to said extension pivot, said footplate clamp being structured and dimensioned to clamp the footplate to said footplate pivot.

19. A wheelchair according to claim 16, wherein said extension clamp is bifurcated to include a recess clamp and a threaded clamp, said recess clamp and said threaded clamp being structured and dimensioned to be joined together about said extension pivot and said orbital pivot.

20. An extension tube according to claim 2, wherein said extension tube is structured and dimensioned to slidably engage the hanger, said extension tube being slidably adjustable in elevation relative to the hanger to adjust the elevation of the footplate.

21. An extension tube according to claim 2, wherein said extension tube has a shape complementary to that of the hanger.

22. An extension tube according to claim 2, wherein said extension tube and the hanger are structured and dimensioned to retain the footplates in a forwardly disposed position upon engaging said extension tube with the hanger.

23. An adjustable linkage assembly according to claim 2, wherein said extension tube is adapted to matingly engage the hanger so that rotation of said extension tube relative to the hanger is prevented.

* * * * *

UNITED STATES PATENT AND TRADEMARK OFFICE

CERTIFICATE OF CORRECTION

PATENT NO. : 6,217,050 B1
DATED : April 17, 2001
INVENTOR(S) : Paul C. Dickie and Karen A. Hada It is certified that error appears in the above-identified patent and that said Letters Patent is hereby corrected as shown below:

Column 10, claim 20,
Line 15, delete "extension tube" and insert -- adjustable linkage assembly --

Column 10, claim 21,
Line 20, delete "extension tube" and insert -- adjustable linkage assembly --

Column 10, claim 22,
Line 23, delete "extension tube" and insert -- adjustable linkage assembly --

Signed and Sealed this

Sixth Day of November, 2001

*Attest:*

Nicholas P. Godici

NICHOLAS P. GODICI
*Attesting Officer* *Acting Director of the United States Patent and Trademark Office*